Figure 7:
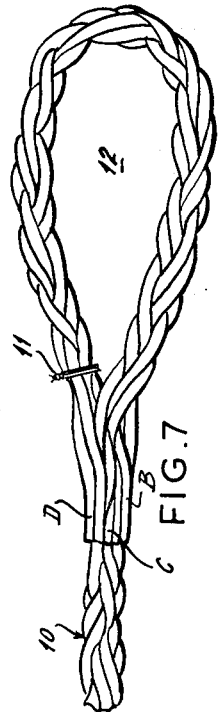

Sept. 7, 1965 W. W. LAWSON ETAL 3,204,519
BRAIDED SLING AND METHOD OF MAKING THE SAME
Filed July 3, 1963 2 Sheets-Sheet 1
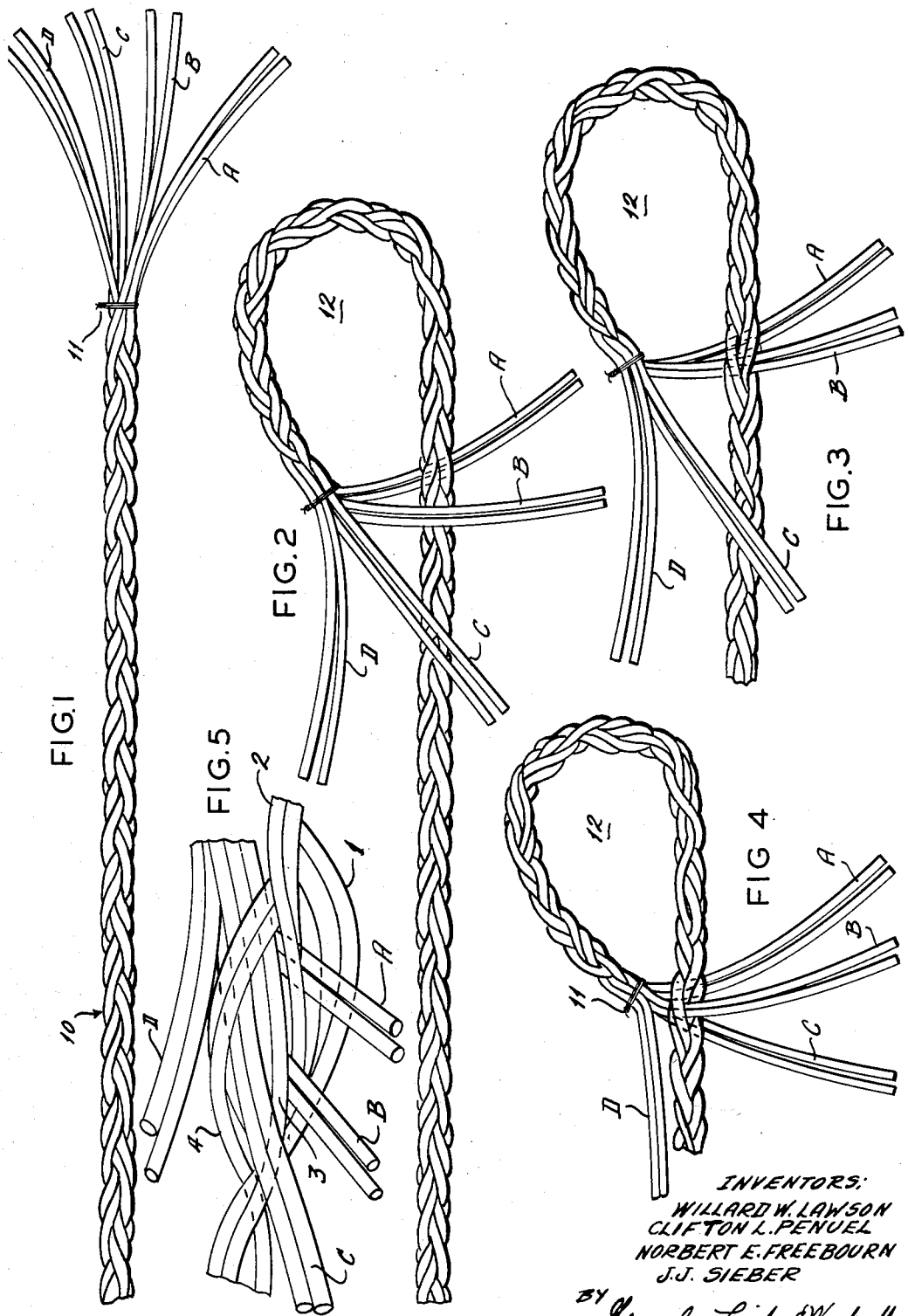
INVENTORS:
WILLARD W. LAWSON
CLIFTON L. PENUEL
NORBERT E. FREEBOURN
J. J. SIEBER
BY Gravely, Lieder & Woodruff
ATTORNEYS.

Sept. 7, 1965

W. W. LAWSON ETAL 3,204,519

BRAIDED SLING AND METHOD OF MAKING THE SAME

Filed July 3, 1963

2 Sheets-Sheet 2

INVENTORS:
WILLARD W. LAWSON
CLIFTON L. PENUEL
NORBERT E. FREEBOURN
J.J. SIEBER

BY Gravely, Lieder & Woodruff
ATTORNEYS.

United States Patent Office 3,204,519
Patented Sept. 7, 1965

3,204,519
BRAIDED SLING AND METHOD OF
MAKING THE SAME
Willard W. Lawson, Overland, Clifton L. Penuel, St. Peters, Norbert E. Freebourn, Bridgeton, and Janez J. Sieber, Webster Groves, Mo., assignors to Broderick and Bascom Rope Company, St. Louis, Mo., a corporation of Missouri
Filed July 3, 1963, Ser. No. 292,661
7 Claims. (Cl. 87—8)

The present invention relates to wire rope slings, and more particularly to a braided wire rope sling having braided or plaited eyes formed on one or both ends thereof and secured by a metal sleeve and to a simple method of forming the eyes.

Heretofore, simple formation of a braided eye in a braided wire rope sling has been difficult without introducing weakness into the sling. It is therefore a principal object of the present invention to provide a braided eye on a braided wire rope sling by a method which is simple in practice and maintains an efficiency equal to the full strength of the fabric from which it is made.

A further object of the present invention is to provide a wire rope braided sling with a braided eye made from a fabric consisting of separate individual wire ropes which are either machine or hand braided or plaited in a continuous method gaited to mass production.

Another object of the present invention is to provide a method of making a balanced braided eye on the end of a braided wire rope sling. Still a further object of the present invention is to provide a method of making a braided loop on the end of a braided wire rope sling which is a continuation of the body of the sling.

Another object of the present invention is to provide a method of making an integral braided wire rope sling and loop which is particularly suitable for use in conjunction with a continuous braiding machine which produces a continuous length of braided wire rope.

These and other objects and advantages will become apparent hereinafter.

The present invention comprises a balanced integral braided wire rope sling and loop formed by tucking a portion of the free ends of the wire ropes back into the body of the braided wire, laying the remainder of the free ends of the wire rope on the surface of the body of the braided wire and clinching the loop with a deformable sleeve applied to the rope ends and the body fabric in the area of the tucking. The present invention also comprises the method of making the braided wire rope and loop hereinafter described and claimed.

Figure 9:
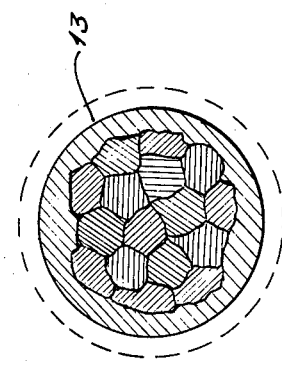
Figure 10:
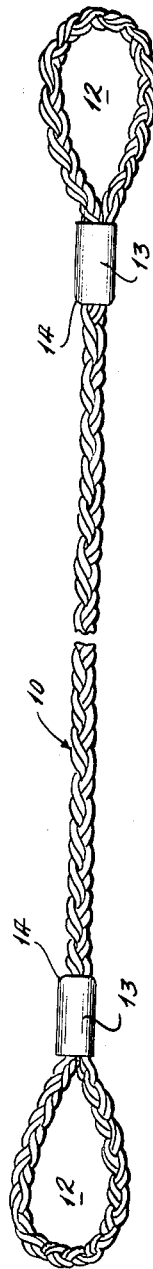
Figure 6:
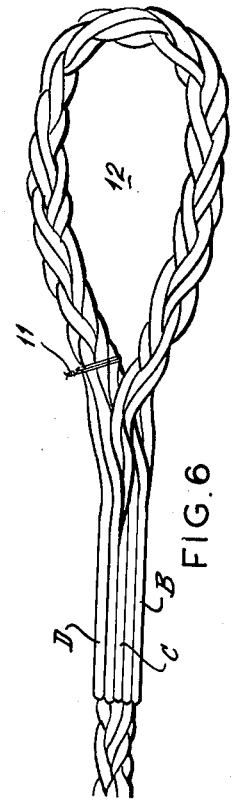
Figure 8:
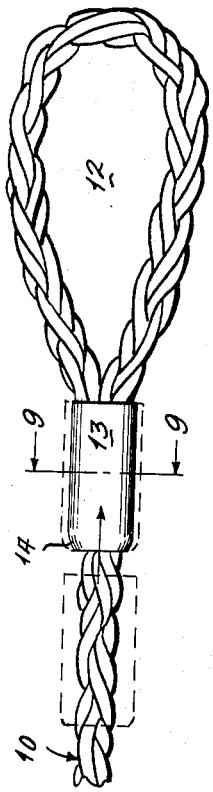

In the drawings, wherein like numbers refer to like parts wherever they occur,

FIG. 1 is a plan view of a braided wire rope with a serving wire applied adjacent to one end with the pairs of ropes forming the braid being separated, FIG. 2 is a plan view of the braided rope of FIG. 1 after one pair of ropes is tucked back into the body of the braided rope, FIG. 3 is a view similar to FIG. 2 showing a second pair of ropes tucked back into the body of the braided rope, FIG. 4 is a view similar to FIG. 2 showing a third pair of ropes tucked back into the body of the braided rope, FIG. 5 is a fragmentary perspective view of the rope shown in FIG. 4 rotated about 60°, showing the tucking of the free ends of the rope into the braided rope body, FIG. 6 is a plan view of the braided rope of FIGS. 1–5 showing the fourth pair of ropes laid on the braided rope body in a balanced arrangement with the tucked rope pairs, FIG. 7 is a view similar to FIG. 6 with the ends of the pairs of ropes cut to final length, FIG. 8 is a view of the rope of FIG. 6 with the ductile metal sleeve applied and compressed, the full size sleeve being shown in broken lines and the compressed sleeve being shown in solid lines, FIG. 9 is a sectional view taken along line 9—9 of FIG. 8, and FIG. 10 is a plan view of a braided wire rope sling having loops on each end.

FIG. 1 shows a continuously braided wire rope 10 to which a serving wire 11 has been applied at a point adjacent to and spaced from one end. The free end of the braided wire rope 10 is broken down into the four basic pairs of ropes which comprise the fabric. The pairs are designated A, B, C and D.

In our preferred embodiment, the body of the rope 10 is formed continuously on a continuous braiding machine and is cut into suitable lengths. The ends of the lengths of rope 10 then have the serving wire 11 attached, and the remaining lengths of the free ends are broken down into the basic pairs A, B, C and D as shown in FIG. 1.

Although other methods of braiding a loop on a sling have been proposed, the present method is particularly advantageous, since it allows the basic part of a sling and loop to be machine braided into an integral unit and only the final portion of fastening the loop is done by hand.

Although we use the general terminology "braided wire rope fabric composed of basic pairs of individual wire ropes" and have illustrated a braided fabric composed of eight individual wire ropes (or four basic pairs), it is understood that the present method is suitable for forming a sling from a fabric composed of any other even number of wire ropes greater than two; for instance, a comparable fabric can be constructed from only four wire ropes. Also, the individual wire ropes are a stranded structure which may be a one strand, a number of strands, or a number of small wire ropes. The individual ropes may have an independent wire rope core, fiber core, metal or fiber strand core, coiled metal spring core, or any synthetic solid or stranded rope or strand, or any other animal, vegetable, mineral or synthetic core, and may be right lay or left lay or any combination of lays. The wire ropes used may be regular lay, lang lay or alternate.

In FIGS. 2–4, a portion of the rope pairs A—D are laced back into the body of the braided wire rope 10 at a point spaced from the serving wire 11 toward the opposite end of the rope 10 to roughly define a loop 12. The loop 12 is integral with the body 10, is continuous, and is formed in a simple and efficient fashion. FIGS. 6 and 7 show the positioning of the remainder of the pairs of ropes A—D on the outer surface of the body of the braided wire rope 10 to form a balanced symmetrical construction for the juncture of the loop 12 and the body of the rope 10.

The balanced symmetrical joint is imperative, because it insures equalized pressure and proper positioning in the application of the metal sleeve 13 (FIGS. 8 and 9) which is an integral part of the method of forming and fastening the loop or eye 12. This balanced arrangement of the tucked and laid-over rope pairs A—D is the unique feature of the present invention, and provides for equalized sleeve pressures against the rope ends and braided wire rope body. This in turn provides the high strength and efficiencies attained in the final sling and loop.

The specific pattern for lacing a preselected portion of the pairs of ropes A—D into the body of the braided wire rope 10 is shown in FIGS. 2–5.

In the first step (FIGS. 2 and 5) basic pair A is tucked over the bottom pair of ropes No. 1 of the braided wire rope fabric rope body 10. Rope pair No. 1 is arbitrarily picked from the body of the braided wire rope 10 at a point convenient to the juncture formed by the bending of the fabric 10 and commensurate with the formation of a proper size of eye 12. In other words, when the free end of the braided wire rope 10 is turned back on itself to form the eye 12, the bottom-most pair of ropes A is tucked beneath the bottom-most pair of ropes 1 which occur at the point where the junction of the free end of the rope 10 is to be tucked into the braided wire rope body to form the proper size eye 12.

The next step is shown in FIGS. 3 and 5 and basic pair B of the free end is tucked over rope pair No. 2 of the braided wire rope fabric 10. Rope pair No. 2 is the next adjacent pair to pair No. 1 proceeding in a clockwise or counterclockwise direction. Defined differently, pair B is tucked over both pair No. 1 and pair No. 2 and lies adjacent to the top side of pair No. 2.

Basic pair A is interposed between rope pair No. 1 and rope pair No. 2 and lies adjacent to the upper surface of pair No. 1 (FIG. 5).

The third and final tucking step is shown in FIGS. 4 and 5. In this step, pair C is laced over pair No. 3 of the braided wire rope fabric 10. Pair C is the next adjacent pair to B proceeding in a clockwise or counterclockwise direction. Stated differently, pair C is positioned above rope pairs No. 1, No. 2 and No. 3, but is positioned immediately above and adjacent to the upper surface of pair No. 3. Furthermore, pair C is interposed between rope pair No. 3 and pair No. 4 (FIG. 5).

The remainder of the basic pairs of ropes, basic pair D, is not laced into the body of the braided wire rope 10 (FIG. 5) in any fashion, but is laid adjacent to the outer surface of the braided wire rope body to provide a balanced symmetrical arrangement at the joint area and to insure proper positioning of the fabric 10 in relation to the sleeve 13 and the eye 12 to provide a balanced load and maintenance of high load efficiency.

The free ends of the laced basic pairs A, B and C and the free end of basic pair D next are laid parallel to the body of the rope 10 in a symmetrical pattern (FIG. 6).

At this point in the loop forming process, the ends of the pairs A—D are cut to the proper length (FIG. 7).

The aforementioned laces or tucks constitute what is known in the art of splicing as forming tucks, and are not intended as a contribution to the strength of the sling, but their primary function is to provide for a symmetrical construction which insures equal sleeve pressures. The application of the ductile metal sleeve shown in FIGS. 8 and 9 forms a joint of high strength, equal to or exceeding the theoretical ultimate strength of the braided wire rope fabric 10.

The sleeve 13 is hollow, has tapered ends 14 and is formed of a ductile metal, preferably an aluminum alloy. The sleeve 13 is positioned over the second free end of the braided wire rope 10, or may be passed over the end of the braided wire rope 10 before the loop 12 is formed as hereinbefore described in detail. The ends of the sleeve 13 may be straight, if a straight pressing die is used.

With the sleeve 13 on the braided wire rope body 10, and the loop 12 formed, the sleeve 13 then is passed over the cutoff ends of the tucked and laid-on pairs A—D and compressed (indicated by the solid lines of FIGS. 8 and 9) so that the metal flows into the valleys, voids, and interstices of the terminal rope ends and braided fabric body without cracking (FIG. 9).

FIG. 9 shows sixteen individual wire ropes tightly compressed together by the compressed sleeve 13. The individual wire ropes are sectioned for metal for purposes of simplicity of the drawings, but it it understood that the individual wire ropes may be of any construction as hereinbefore described in detail, and normally are composed of a number of strands and may include a non-metallic core.

The sleeve 13 has a metal composition sufficiently strong to interlock the terminal ends tightly and is sufficiently ductile so that it does not cause serious damage to the wires or component parts which are engaged when the sleeve 13 is subjected to the necessary pressing pressures. The sleeve 13 assists in the interlocking of the terminal ends of the sling so that the joint between the sling and the loop is of a strength equal to or exceeding the theoretical ultimate strength of the braided fabric. The sleeve 13 also facilitates sling use in the normal practice to which it is submitted. The sleeve 13 and tucked interlock forms a joint in which the movement of the terminal ends of the rope is restricted to prevent the joints becoming unbalanced and forming an inefficient loop connection.

Although we have demonstrated and described the fabrication of a braided wire rope sling with a braided wire rope eye, the sling and eye can be outfitted with thimbles half-thimbles, hooks, shackles or any other wire rope fittings peculiar to the wire rope industry.

Thus it is seen that the present invention provides a simple and convenient method of making a braided integral rope and loop which is particularly suitable for forming a loop on the end of a mechanically continuously braided sling.

This invention is intended to cover all changes and modifications of the examples of the invention herein chosen for purposes of the disclosure, which do not constitute departures from the spirit and scope of the invention.

What is claimed is:

1. A method of making a braided integral wire rope sling and loop including the steps of breaking down one end of a braided wire rope fabric into its basic elements, forming a loop with the so broken down end, lacing a predetermined number of the basic elements back into the braided body of the fabric, laying the remainder of the elements along the outer suface of the fabric to form a balanced arrangement, and applying a compression sleeve to the laced and laid-on elements.

2. A method of making a braided integral wire rope sling and loop including the steps of breaking down the free end of a braided wire rope fabric into its basic number of pairs, forming a loop on the free end, lacing a predetermined number of the pairs back into the fabric after the loop is formed, laying the remainder of the pairs on the outside of the fabric so that the entire lacing area is a balanced symmetrical arrangement, applying a deformable sleeve to cover the area of the tucking, and compressing the sleeve tightly around the fabric and the tucked and laid free ends so that the sleeve interlocks the free ends and flows into the valleys of the endings and the braided fabric body.

3. The method of claim 2 wherein the braided fabric comprises four pairs and three of the pairs are laced into the fabric and the fourth is laid on the outer surface of the fabric.

4. A method of making a braided integral wire rope sling and loop comprising the steps of continuously braiding a wire rope, severing the wire rope into sling lengths, applying serving wire to one of the lengths of braided rope at a point spaced from the free end thereof, separating the rope into its basic braid elements, lacing a portion of the free ends of the braid elements back into the braided body of the rope in a symmetrical systematic fashion, laying the remainder of the braid elements on the outer surface of the rope to balance the juncture of the loop to the body of the sling, and applying a compression sleeve to the sling at the juncture of the free ends and the rope body.

5. The method of claim 4 wherein the basic braid elements are laced back into the rope body in a predetermined stepwise contiguous manner including the steps of tucking a first braid element beneath an outside braid element in the body of the rope, tucking a second braid element beneath the next adjacent braid element in the body of the rope, tucking a third braid element beneath the now next adjacent braid element in the body of the rope, and laying a fourth braid element on the outer surface of the rope body.

6. A continuous unitary braided rope and sling comprising a braided rope body formed by basic rope elements, a braided loop on one end of the body, said loop being formed by a continuation of the same basic rope elements that form the rope body, and a junction between the loop and the rope body comprising the basic elements of the loop separated and a portion of the elements individually tucked back into the braided rope body in a systematic contiguous pattern, the remainder of the basic rope elements being laid adjacent to the outer surface of the rope body, and a compression sleeve tightly gripping the juncture and flowed into the valleys between the rope elements to hold the elements in a balanced symmetrical joint.

7. The structure of claim 6 wherein the tucked portion of the separated basic elements of the loop are tucked individually beneath individual adjacent rope elements of the rope body with the untucked portion of the basic elements being arranged in a balanced symmetrical arrangement at the area of juncture of the loop and the body.

References Cited by the Examiner

UNITED STATES PATENTS

| | | | |
|---|---|---|---|
| 219,860 | 9/79 | Healey | 57—142 |
| 1,839,698 | 1/32 | Novotny | 57—142 |
| 2,414,664 | 1/47 | Peterson | 87—8 X |
| 3,008,208 | 11/61 | Stephan | 57—142 X |
| 3,008,287 | 11/61 | Crandall | 57—142 |

FOREIGN PATENTS 702,998  1/54  Great Britain.

MERVIN STEIN, *Primary Examiner.*